(12) United States Patent
Wilson et al.

(10) Patent No.: US 8,224,919 B2
(45) Date of Patent: Jul. 17, 2012

(54) MOBILE COMMUNICATIONS SYSTEM INCLUDING INTERMEDIATE SERVICE PROVIDER AND RELATED METHODS

(75) Inventors: Christopher Robert Wilson, Carpentersville, IL (US); Jin Woo Lee, Huntley, IL (US); Mihaela K. Mihaylova, Schaumburg, IL (US); Roberto Diaz, Inverness, IL (US)

(73) Assignee: Research In Motion Limited, Waterloo, Ontario (CA)

( * ) Notice: Subject to any disclaimer, the term of this patent is extended or adjusted under 35 U.S.C. 154(b) by 1257 days.

(21) Appl. No.: 11/696,282

(22) Filed: Apr. 4, 2007

(65) Prior Publication Data

US 2008/0247348 A1 Oct. 9, 2008

(51) Int. Cl.
*G06F 13/00* (2006.01)
(52) U.S. Cl. .................................... 709/207
(58) Field of Classification Search ............... 709/207
See application file for complete search history.

(56) References Cited

U.S. PATENT DOCUMENTS

| | | | |
|---|---|---|---|
| 6,742,127 B2 | 5/2004 | Fox et al. | |
| 6,947,431 B1 | 9/2005 | Bergeron | |
| 7,039,394 B2 | 5/2006 | Bhaskaran | |
| 7,120,455 B1 | 10/2006 | Chen et al. | |
| 7,136,377 B1 | 11/2006 | Tweedly | |
| 7,155,483 B1 | 12/2006 | Friend et al. | |
| 2002/0194226 A1 | 12/2002 | Sheth et al. | |
| 2003/0084177 A1 | 5/2003 | Mulligan | 709/230 |
| 2003/0129969 A1 | 7/2003 | Rucinski | |
| 2003/0231207 A1 | 12/2003 | Huang | |
| 2004/0087300 A1 | 5/2004 | Lewis | |
| 2004/0199665 A1 | 10/2004 | Omar et al. | |
| 2005/0002335 A1 | 1/2005 | Adamczyk et al. | 370/230 |
| 2005/0021638 A1 | 1/2005 | Caldini et al. | |
| 2005/0097440 A1 | 5/2005 | Lusk et al. | |
| 2005/0108334 A1 | 5/2005 | Tam et al. | |
| 2005/0246445 A1 | 11/2005 | Panasyuk et al. | 709/227 |
| 2006/0009243 A1* | 1/2006 | Dahan et al. | 455/466 |

(Continued)

FOREIGN PATENT DOCUMENTS

EP 1021021 A2 7/2000
(Continued)

OTHER PUBLICATIONS

"User Datagram Protocol", http://en.wikipedia.org/wiki/user_datagram_protocol, Jan. 16, 2007.

(Continued)

*Primary Examiner* — Robert B Harrell
(74) *Attorney, Agent, or Firm* — Allen, Dyer, Doppelt, Milbrath & Gilchrist, P.A.

(57) ABSTRACT

An intermediate service provider operates to mediate communications between mobile terminals and various service providers. In one embodiment, the intermediate service provider and a given mobile terminal establish a persistent session supported by a logical communication channel that is used to convey communications for all of the various service applications implemented by the mobile terminal, i.e., a single, multiplexed channel. In another embodiment, common command subsystems are used to support the multiple service applications, thereby reducing overhead resulting from multiple protocol headers. In yet another embodiment, establishment of communications with various service providers begins with a single connection request message that specifies at least two selected service applications such that the intermediate service provider can establish communications with the multiple service providers in response to the single connection request message.

35 Claims, 9 Drawing Sheets

U.S. PATENT DOCUMENTS

| | | |
|---|---|---|
| 2006/0095529 A1 | 5/2006 | McNamara et al. |
| 2006/0123079 A1 | 6/2006 | Sturniolo et al. ............. 709/203 |
| 2006/0218234 A1 | 9/2006 | Deng et al. |
| 2006/0224750 A1 | 10/2006 | Davies et al. |
| 2007/0033255 A1 | 2/2007 | Sanjeeva et al. |

FOREIGN PATENT DOCUMENTS

| | | |
|---|---|---|
| EP | 1022875 A1 | 7/2000 |
| EP | 1315336 A1 | 5/2003 |
| EP | 1555793 A2 | 7/2005 |
| EP | 1667042 A2 | 7/2006 |
| GB | 2401011 A | 10/2004 |
| JP | 2005032055 A1 | 3/2005 |
| WO | 2002058356 A2 | 7/2002 |
| WO | 2003084136 A1 | 10/2003 |
| WO | 2004099919 A2 | 11/2004 |
| WO | 2004100586 A2 | 11/2004 |
| WO | 2006028760 A2 | 3/2006 |

OTHER PUBLICATIONS

"Transmission Control Protocol", http://en.wikipedia.org/wiki/transmission_control_protocol, Jan. 16, 2007.

* cited by examiner

MOBILE COMMUNICATIONS SYSTEM INCLUDING INTERMEDIATE SERVICE PROVIDER AND RELATED METHODS

FIELD OF THE INVENTION

The present invention relates generally to communication systems comprising a plurality of mobile terminals and, in particular, to communications between such mobile terminals and a plurality of network-based service providers.

BACKGROUND OF THE INVENTION

Mobile wireless communication systems are well known in the art. Within such systems, a plurality of mobile terminals, such as cellular telephones, push-to-talk radios, etc., are able to communicate with one another via wireless channels supported by a wireless infrastructure. Traditionally, such mobile terminals only supported voice communications. Recently, however, the processing power available within such mobile terminals has increased to the point that, in addition to voice transmission services, it is not uncommon for mobile terminals to include, for example, instant messaging applications, electronic mail applications, calendar applications, address book applications, etc. Indeed, some service applications supported by mobile terminals are capable of implementing more than one of these functions. Service applications of this type are typically implemented using stored software programs on a mobile terminal that interact with a corresponding network-based service provider.

This is further illustrated in FIG. 1 in which a plurality of mobile terminals 100 (only one shown for simplicity) communicate with a plurality of service providers 101 via a publicly available network 103 such as the Internet or World Wide Web (WWW) and a wireless network 105. In particular, each of the service applications 107 establishes communications with a corresponding service provider 100 via a unique session 109. In the illustrated example, two instant messaging (IM) applications 107a,b are in communication 109a,b with corresponding IM service providers 101a,b. Similarly, an email application 107c and a synchronization-capable application 107d (e.g., a calendar or address book application) are likewise in communication 109c,d with corresponding email and synchronization service providers 101c,d.

Typically, each session 109 is implementing using the so-called Transmission Control Protocol (TCP) as known in the art. Quite often, TCP connections are implemented on top of Internet Protocol (IP) addresses (i.e., addresses uniquely associated with individual mobile terminals), as known in the art. Such TCP/IP connections (typically implemented in fixed, wired networks) allow applications running on different hosts to reliably exchange streams of data. However, in a wireless environment such as that depicted in FIG. 1, the usefulness of such TCP/IP connections is diminished given the widely-fluctuating reliability of wireless channels between the wireless network 105 and the mobile terminal 100. In such an environment, it is quite typical for the TCP/IP connections to be dropped, necessitating re-establishment of the connections. Furthermore, it is not uncommon for mobile terminals to be equipped to work with multiple communication system types, e.g., a wide-area system such as General Packet Radio Service (GPRS) and local area systems such as "WI-FI" systems. In such devices, the mobile terminal will switch to the lower-cost system when possible. However, this has the effect of requiring re-assignment of an IP address, thereby terminating any existing TCP connections. Because TCP/IP connections are relatively expensive to establish, the need to frequently re-establish such connections make this approach less attractive.

Additionally, the use of multiple connections 109 is less efficient because each connection 109 propagates the full communication protocol all the way to the mobile terminal 101, including all header information, thereby making implementation at the mobile terminal 101 more complex. Various solutions have been proposed to address the complexity of communications caused by multiple service applications. For example, the so-called Extensible Messaging and Presence Protocol (XMPP) and Instant Messaging and Presence Service (IMPS) have been developed as common protocols for instant messaging. However, in addition to being a relatively inefficient, these protocols are limited to support of instant messaging service and do not provide additional support for email operations, synchronization operations, etc.

It would therefore be advantageous to provide reliable and efficient techniques that allow multiple service applications to communicate with their corresponding service providers such that the limitations of prior art approaches described above may be overcome.

SUMMARY OF THE INVENTION

The instant disclosure describes techniques for communicating between a mobile terminal and a plurality of service via intervening wireless and wired communication network. In particular, an intermediate service provider operates to mediate communications between the mobile terminals and the various service providers. In one embodiment, the intermediate service provider and a given mobile terminal establish a persistent session supported by a logical communication channel that is used to convey communications for all of the various service applications implemented by the mobile terminal, i.e., a single, multiplexed channel. For example, the logical channel may be implemented using, for example, the so-called User Datagram Protocol (UDP) based on IP addresses. Using such a channel, both the mobile terminal and intermediate service provider multiplex data communications for at least two different service applications onto the logical communication channel. Because service providers typically operate on a session-based model, establishment of the persistent session allows the intermediate service provider to maintain communications with the service providers regardless of the reliability of the logical communication channel.

Additionally, in another embodiment, better efficiency in comparison to prior art communication protocols is provided through the use of common protocol subsystems in support of multiple service applications. For example, a first set of commands may be provided that supports functionality common to all of the various service applications available in the system. In contrast, one or more additional sets of commands may be defined in which each additional command set embodies functionality that is common to a given service class, e.g., IM services, email services, etc. In this manner, it is possible to support applications having common functionality in a much more efficient manner due to the reduction in overhead.

In yet another embodiment, establishment of communications with various service providers is greatly simplified through the use of a single connection request message whenever a mobile unit desires to establish communications with more than one service provider. In particular, the connection request message specifies at least two selected service applications such that the intermediate service provider can establish communications with the multiple service providers in response to the single connection request message.

BRIEF DESCRIPTION OF THE DRAWINGS

The features of the present invention are set forth with particularity in the appended claims. The present invention itself, together with further features and attendant advantages, will become apparent from consideration of the following detailed description, taken in conjunction with the accompanying drawings. One or more embodiments of the present invention are now described, by way of example only, with reference to the accompanied drawings wherein like reference numerals represent like elements and in which:

DETAILED DESCRIPTION OF THE PRESENT EMBODIMENTS

Figure 1:
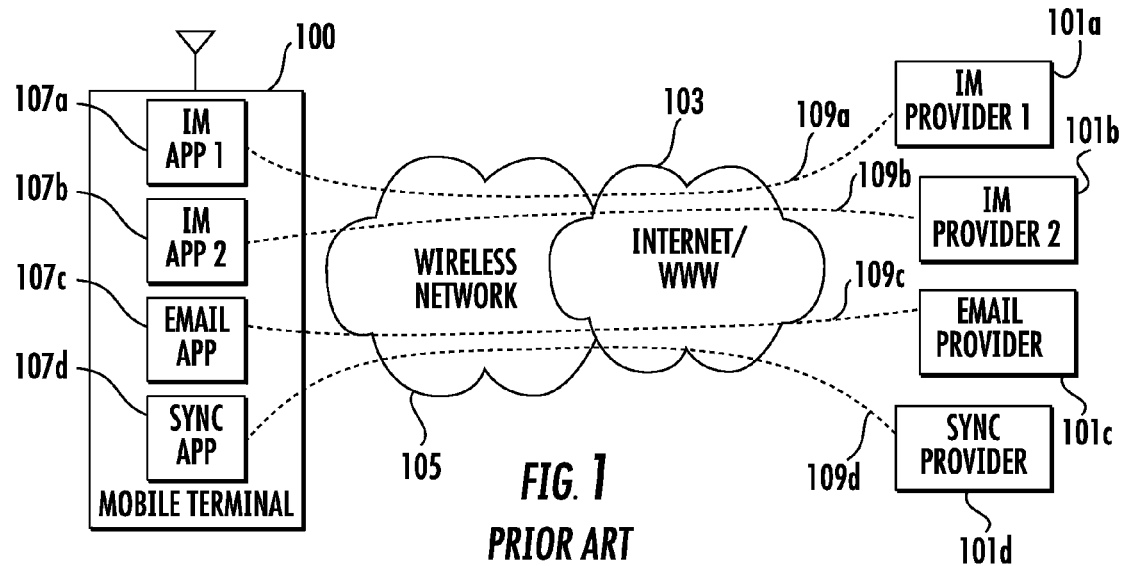
FIG. 1 is a schematic block diagram of a communication system in accordance with prior art techniques.
Figure 2:
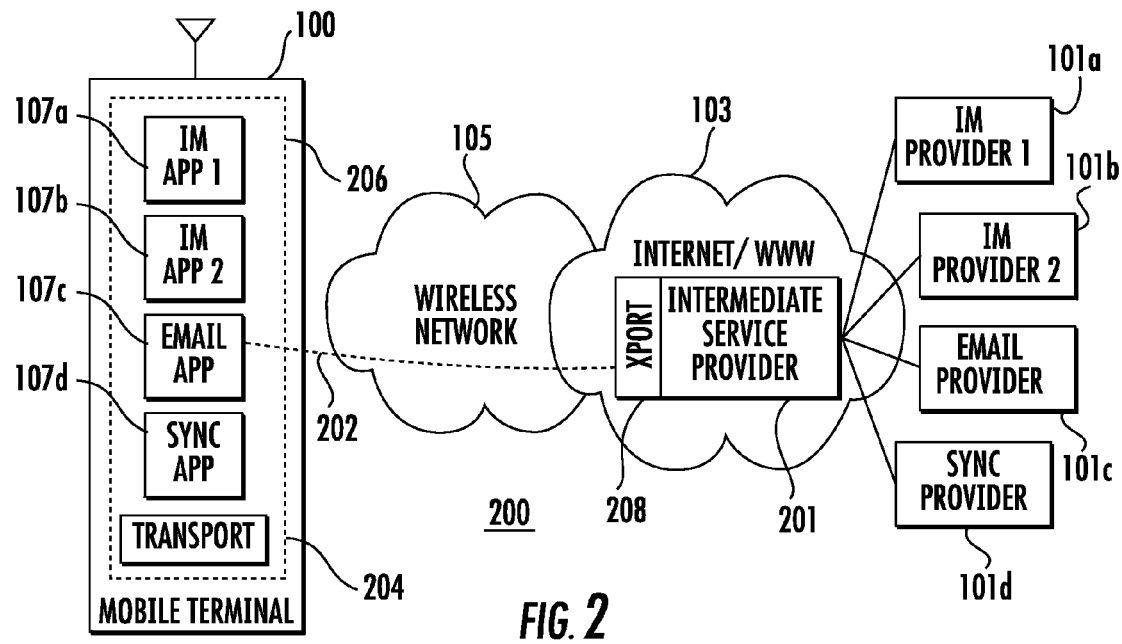
FIG. 2 is a schematic block diagram of a communication system in accordance with an embodiment of the present invention.

Referring now to FIG. 2, a communication system 200 in accordance with an embodiment of the present invention is further illustrated. The communication system comprises a plurality of mobile terminals 100 (only one shown for simplicity) in communication with a plurality of service providers 101 via a wireless network 105 and a public communication network 103. Although termed a public communication network 103, those having ordinary skill in the art will appreciate that elements of private communication networks (e.g., enterprise intranets, local area networks, etc.) may be equally employed. Within the public communication network 103, an intermediate service provider 201 serves as an interface between the proprietary protocols 206 of the various service providers 101, and the wireless network 105. In particular, the intermediate service provider 201 supports communications with the mobile terminal 100 via a persistent session 202 established there between. As used herein, a persistent session 202 is a logical connection between the intermediate service provider 201 and the mobile terminal 100 that persists regardless of the reliability of the underlying logical channel, e.g., UDP/IP. In effect, the persistent session 202 allows the intermediate service provider 201 to present the appearance of a continuous session to the service providers 101 and acts as a multiplex conduit for supporting communications between the multiple service applications 107 and their corresponding service providers 101. As described in greater detail below, transport layers 204, 208 are provided within the mobile terminal 100 and intermediate service provider 201, respectively, to handle message processing for the logical channel and manage the persistent sessions. In essence, the transport layers 204, 208 terminate the multiplex protocol between the intermediate service provider 201 and mobile terminal 100.

Figure 3:
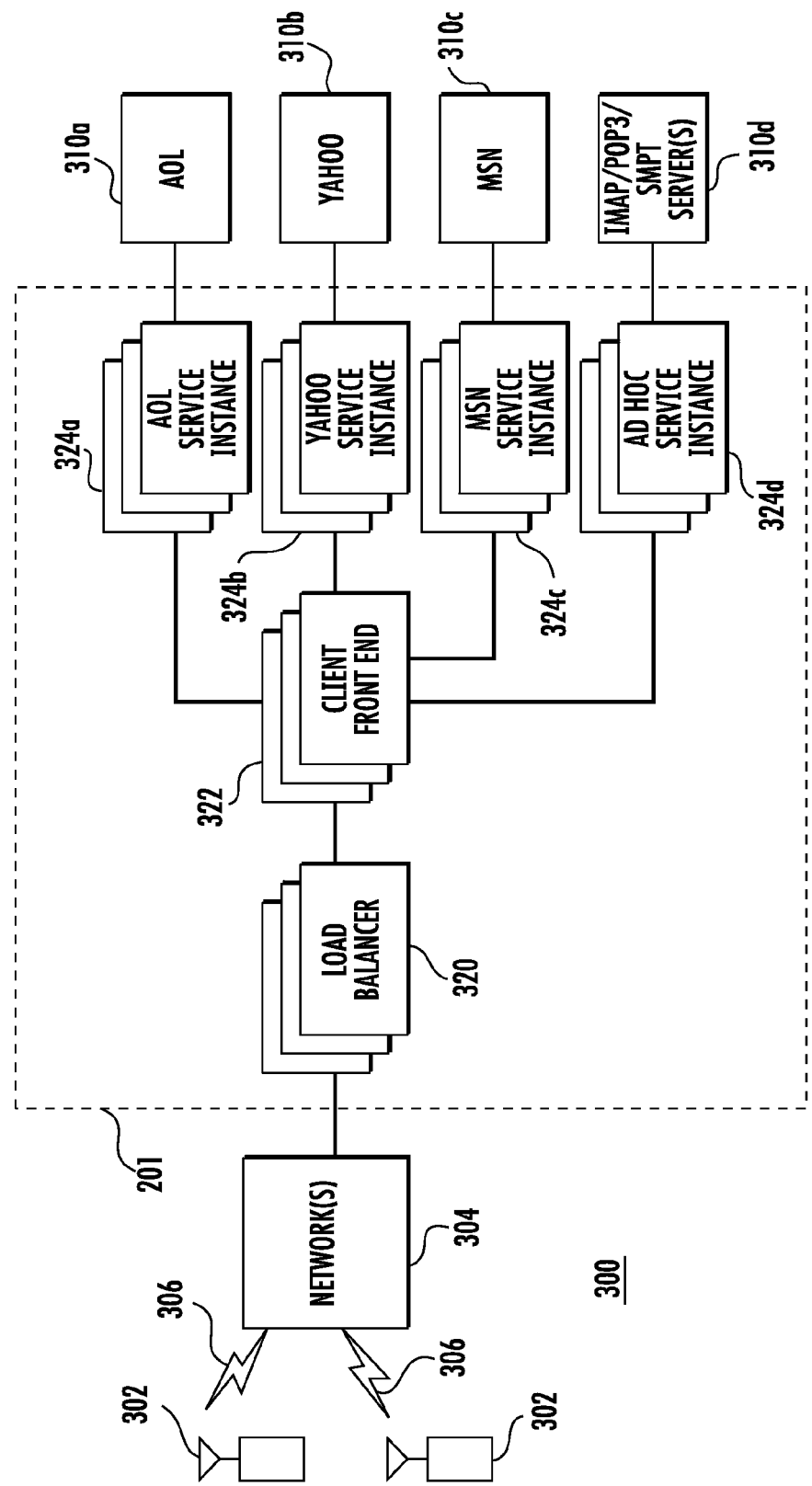
FIG. 3 is a schematic block diagram illustrating in greater detail a communication system in accordance with an embodiment of the present invention including, in particular, an intermediate service provider.

Referring now to FIG. 3, a communication system 300 in accordance with an embodiment of the present invention is illustrated in further detail including, in particular, greater detail of the intermediate service provider 201. As shown, the system 300 comprises a plurality of mobile terminals 302 communicating with each other and a plurality of service providers 310 via one or more communication networks 304 and the intermediate service provider 201.

As known in the art, each of the mobile terminals 302 may comprise a combination of processing components operating under control of various stored executable instructions, i.e., software programs. For example, each mobile terminal may comprise one or more processing devices (such as microprocessors, microcontrollers, digital signal processors, etc. or combinations thereof) coupled to suitable storage devices (such as volatile and/or non-volatile memory devices) having stored thereon suitable instructions for implementing the functionality described herein through execution of such instructions by the processing device(s). Additionally, the mobile units 302 may each comprise necessary hardware circuitry to communicate via wireless channels 306 with one or more wireless networks 304. Techniques for implementing such mobile terminals are well known to those having ordinary skill in the art. Similarly, the one or more communication networks 304 may comprise one or more wireless networks as described above, as well as any public or private data communication network such as the Internet, World Wide Web, local area networks (LANs), wide area networks (WANs), virtual private networks (VPNs), etc. Once again, techniques for implementing such wireless and wired networks, or combinations thereof, are well known to those having ordinary skill in the art.

As shown, the intermediate service provider 201 operates as an interface between the one or more networks 304 and the plurality of service providers 310. Preferably, the intermediate service provider 201 is implemented using stored software programs executing on one or more server computers as known to those of skill in the art. However, it is equally understood that other implementation techniques may be equally employed. For example, any portion of the intermediate service provider 201 or any of the specific components illustrated in FIG. 3 within the intermediate service provider 201 may be implemented using applications specific circuits (ASICs), programmable logic arrays, or other implementation techniques known to those having skill in the art. Regardless of the implementation technique used, the intermediate service provider 201 may comprise one or more load balancers 320 in communication with one or more client front ends 322. In turn, the client front ends 322 are in communication with a plurality of service instances 324 that support interactions with corresponding service providers 310. The various service applications that may be used in accordance with the present invention are well known to those of skill in the art. For example, such service applications may include IM service applications, email service applications as well as synchronization-based applications such as address book applications, calendar applications, or other user data applications known to those of skill in the art. Such service applications may be provided by a variety of different service providers 310. For example, as illustrated in FIG. 3, such service providers may include America Online (AOL), Yahoo, Microsoft Network, and other service providers. As known in the art, such service applications are often implemented using a client/server model, although other implementations may be equally employed.

The load balancers 320, when provided, operate to assign communications received from various mobile terminals to corresponding client front ends 322. For any initial communication received from a mobile terminal, e.g., the first time a mobile terminal establishes communications with the intermediate service provider 201, the load balancer 320 may select a client front end 322 using know load balancing techniques such as round-robin or least-busy assignments. The present invention is not limited in this regard. In a presently preferred embodiment, each mobile terminal connects to a single client front end for the duration of a persistent session. In turn, a given instance of a client front end 322 may support multiple mobile terminals 302. As described in greater detail below, each client front end 322 serves as a switching point for determining which service provider a given message is destined for. Similarly, messages being sent by a service provider 310 to a mobile terminal 302 are handled by the mobile terminal's corresponding client front end 322 to ensure proper compliance with the persistent session and multiplexed channel. Because each client front end 322 is instantiated as a separate process, the intermediate service provider 201 may instantiate as many client front end processes as necessary to more efficiently support the currently active number of mobile terminals 302.

Figure 9:
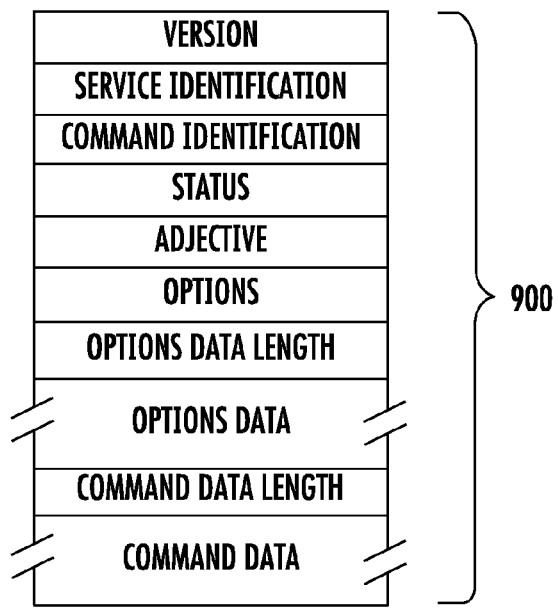
FIG. 9 is a block diagram illustrating a service message in accordance with a presently preferred embodiment of the present invention.

As shown, each client front end 322 is capable to communicating with multiple service instances 324 corresponding to a variety of service providers 310. As further illustrated, each application-specific service instance 324 may be replicated as many times as needed in order to support communication traffic at any given moment. In general, each service instance 324 serves as an interface between the proprietary protocols of each service 310 and the session-based protocol utilized within the intermediate service provider 201 and between the intermediate service provider 201 and the mobile terminals 302. Note that the session-based protocol (utilizing services messages as described below relative to FIGS. 9-11) is illustrated in FIG. 3 as heavy lines between the various components within the intermediate service provider 201, as well as the networks 304 and the mobile terminals 302.

Figure 4:
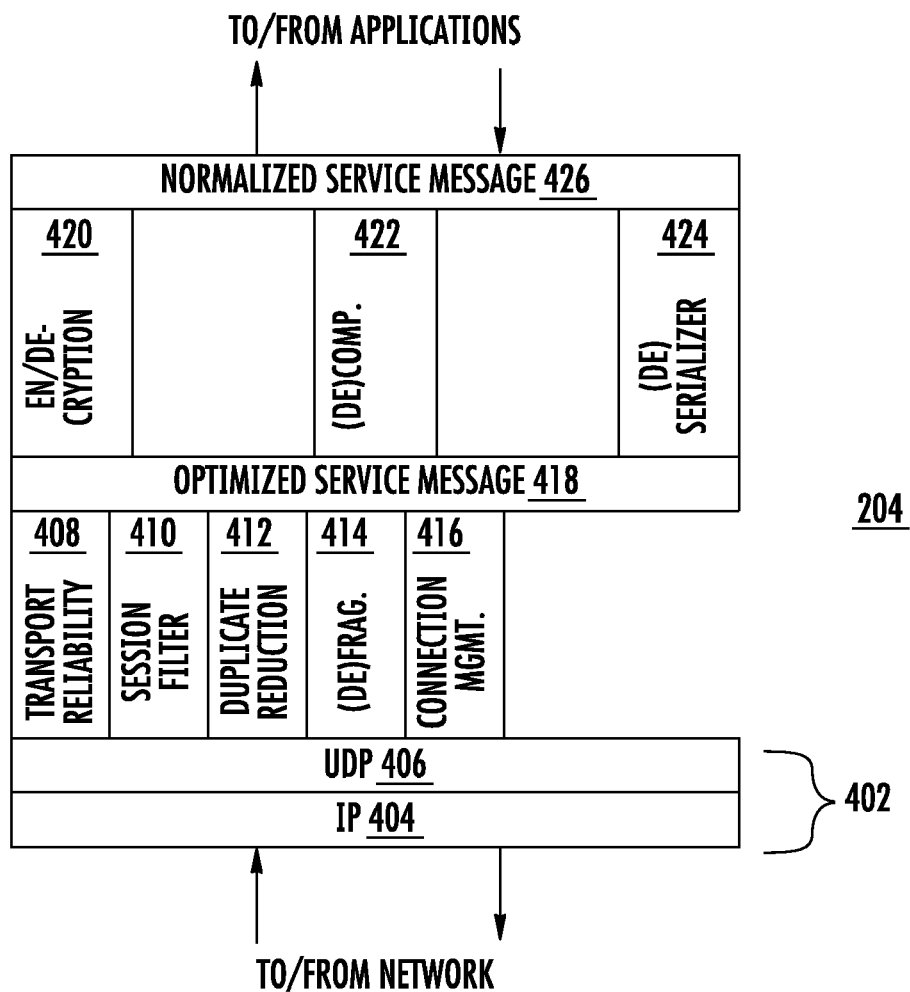
FIG. 4 is a schematic block diagram illustrating transport processing within a mobile terminal in accordance with an embodiment of the present invention.

Referring now to FIG. 4 a schematic block diagram of a transport layer 204 operating within mobile terminals 100, 302 is further illustrated. As known in the art, the transport layer 204 is preferably implemented using stored software programs executed by suitable processing devices within the mobile terminals as described above. Indeed, techniques for implementing the various processing illustrated in FIG. 4 are well known to those of skill in the art. The transport layer 204 may be used to support communications that are either received or originated by the mobile terminal 100, 302 for transmission to the intermediate service provider 201. At the bottom-most levels of the transport 204, a logical channel 402 is defined, preferably, through implementation of a UDP layer supported by an IP layer, as known in the art. As will be appreciated by those of skill in the art, protocols other than UDP and/or IP may be used for the purpose of defining the logical channel 402.

Regardless, messages received from a physical communication channel (i.e., a wireless channel not shown) and addressed to the IP address of a given mobile terminal 100, 302 are processed up through the logical channel 402. Messages received from the logical channel 402 are first handled by a transport reliability process 408 to acknowledge reliably transmitted messages. Thereafter, a session filter 410 is used to determine whether or not the received message is for a currently active persistent session. Techniques for establishing such persistent sessions are further described below. Messages for inactive sessions are discarded at this point whereas, if the received message is for a currently active persistent session, processing continues where a duplicate reduction process 412 eliminates any duplicate messages. As know by those of skill in the art, UDP does not provide the delivery reliability of other, more sophisticated protocols, such as TCP. As a result, it is possible that duplicate messages will be received, which messages, when received, may be discarded. Finally, as described below, it may be necessary to fragment longer messages due to the constraints of the UDP/IP implemented logical channel. As such de-fragmentation (or reassembly) 414 of such fragmented messages also provided. A connection management block 416 is also provided to assist in management of the logical channel 402, particularly to manage any changes thereto. For example, the connection management block 416, where UDP/IP is used, tracks the mobile device's port and/or IP addresses that may change during the persistent session.

Once fully de-fragmented, an optimized service message 418, e.g., one that is possibly compressed and secured (encrypted) as necessary, is provided to the upper layers of the transport layer 204. Furthermore, for the purposes of transmission, an optimized service message 418 may be serialized, i.e., represented in a location- or implementation-independent way so that it can be communicated or stored elsewhere. Where encryption is used to provide security for the service messages, received messages must be decrypted 420 in order to be properly processed. Similarly, in order to minimize bandwidth usage, it may be that the service messages have been compressed, thereby necessitating further decompression processing 422 as shown. Finally, a serializer/de-serializer block 424 is provided that takes the serialized message and de-serializes it to a normalized service message 426, i.e., converts it (using known techniques) into a format that can be directly used by a service application. At this point, a normalized service message 426 is available for provision to the one or more applications implemented by the mobile terminal. A technique for discriminating between which applications a given message targeted to is further described with references to FIG. 12 and FIG. 13 below.

The transport layer 204 illustrated in FIG. 4 may also be used to process communication data (i.e., normalized service message 426) received from one or more applications in preparation for transmission to a service provider via the intermediate service provider 201. In particular, communication data received from an application may be first serialized 424 to prepare the communication data for transmission. Likewise, compression 422 may be applied if the size of the communication data merits such compression. Various compression/decompression techniques suitable for use with the illustrated embodiment will be well known to those of skill in the art. Additionally, as described above, where secure communication is necessary or desired, encryption processing 420 may be likewise applied to the compressed message. Thereafter, the resulting optimized service message 418 is passed to the fragmentation processing 414 for subsequent fragmentation in the event that the message is larger than a maximum packet size that may be transmitted by the logical channel 402.

Figure 5:
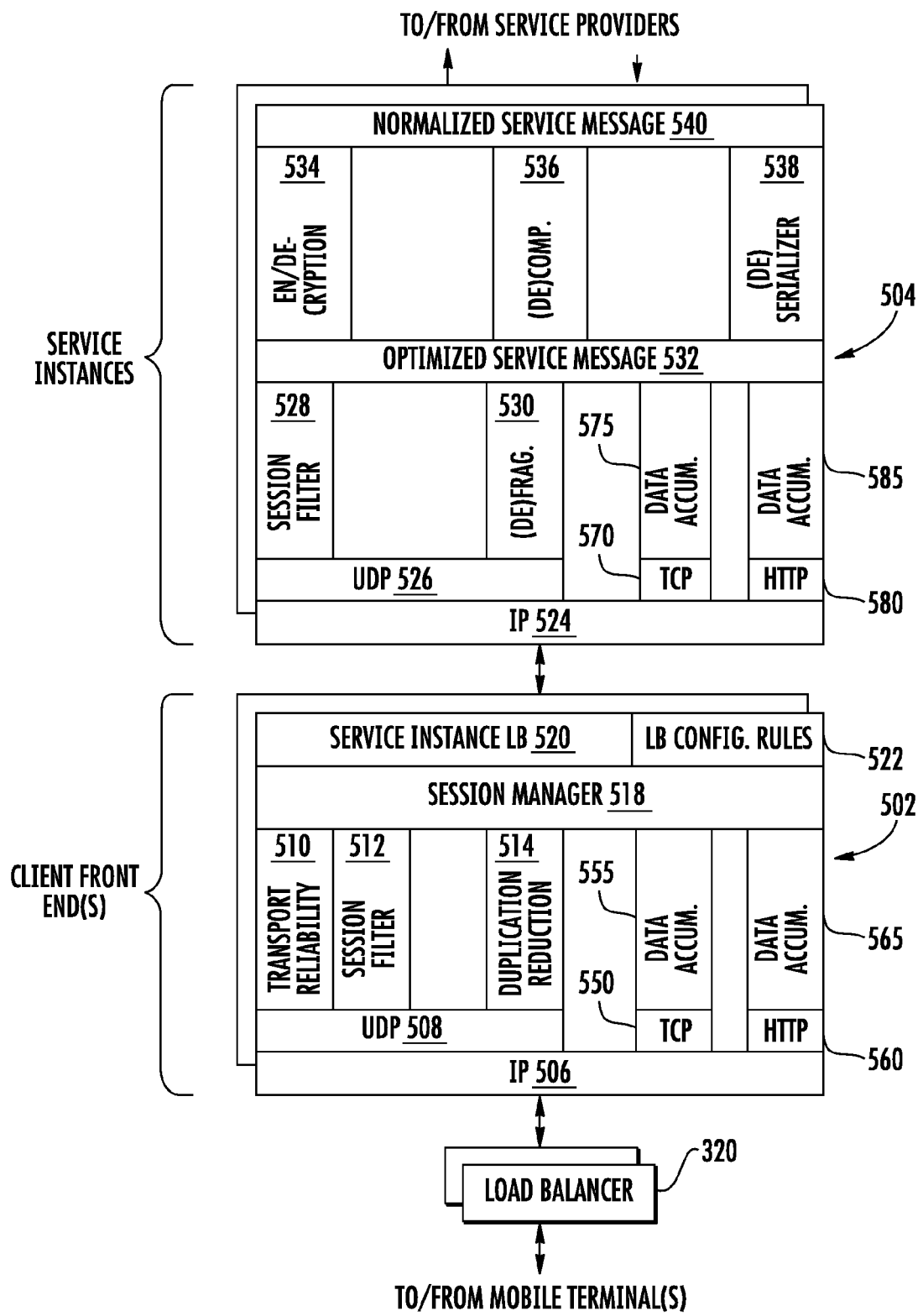
FIG. 5 is a schematic block diagram illustrating transport processing within an intermediate service provider in accordance with an embodiment of the present invention.

Referring now to FIG. 5, the transport layer 208 within the intermediate service provider 201 is further illustrated. In a presently preferred embodiment, the transport layer 208 within the intermediate service provider 201 is split into two transport layers 502, 504 corresponding to the client front ends and service instances, respectively. Once again, the transport layers 502, 504 implement bi-directional processing allowing data received from mobile terminals to be provided to service providers, and for information received from service providers to likewise be processed for subsequent provision to mobile terminals.

In the case of data provided by the mobile terminals, the incoming messages are first received by the load balancer 320 as shown. Assuming that multiple instances of client front ends are operating at any given moment, the load balancer 320 selects that client front end needed to preserve a load balance between the multiple client front end instances (assuming that this message is a first message received from the mobile terminal). Because mobile terminals are bound to corresponding client front ends after their initial contact, subsequent messages are not load balanced and, instead, pass directly through. However, in those instances in which a client front end fails, the load balance may operate to detect this condition and route subsequent messages to another available client front end. Techniques for implementing such load balancing are well known in the art. Within a given instance of a client front end, the incoming message is first processed in accordance with the initial UDP/IP layers 506 based on the IP address of the client front end. As described above relative to FIG. 4, messages provided by the logical channel are acknowledged 510 if reliably sent. Likewise, if a session specified in a given message (as described below) is not currently in existence on the client front end, the message is discarded 512 and the mobile terminal is notified that the session does not exist. If, however, the session does exist, the message is passed to duplicate reduction processing 514 such that any duplicate messages are eliminated. The resulting message is thereafter passed to a session manager 518 which operates to switch the message to the appropriate service instance based on the service identification included in the message. In a manner similar to the load balancer 320, a service instance load balancer 520 operates in accordance with load balancing configuration rules 522 to provide the message (or fragment of a message) to an active service instance based on a service identification included in the message. Once again, techniques for implementing the service instance load balancer 520 according to load balancing rules 522 are well known in the art.

Using UDP/IP identifications unique to a given service instance, the client front end transport layer 502 passes the resulting message (or fragment of a message) to the appropriate service instance. In the case of an inbound message, session filtering 528 to ensure that only messages associated with persistent sessions known to the service instance are processed. Thereafter, de-fragmentation processing 530 is performed, as necessary, to provide a fully-assembled optimized service message 532 (functionally equivalent to the optimized service message 418 described above). As before, if necessary, the optimized service message 532 is decrypted by decryption processing 534, decompressed 536 and de-serialized as described above. The resulting normalized service message 540 is thereafter available for provision to the appropriate service provider.

As before, the transport layers 504, 502 may be used to process communications received from the service provider and destined for the mobile terminal. To this end, the service messages 540 are received from the service provider and serialized 540, compressed 536 and encrypted 534, as needed. The resulting optimized service message 532 is then provided to the fragmentation processing block 530 where, if necessary, it is fragmented. The UDP/IP link between the service instance and the client front end then transports the resulting message (or fragment of a message) to the client front end corresponding to the particular mobile terminal. In one embodiment, this is accomplished by having the service instance maintain a mapping of session identifications to client front ends (as identified by their UPD/IP addresses) based on initial session creations. Once received by the appropriate client front end, the appropriate session information may be appended by the session manager 518 to the message and encapsulated within the necessary UDP/IP headers 506, 508 for transmission to the mobile terminal.

Finally, it is noted that the processing illustrated in FIGS. 4 and 5 is premised on the use of UDP/IP when implementing the logical channel 402 between mobile terminals and client front ends. To this end, the various processing components 408-416, 510-514, 528, 530 illustrated and described are provided to account for the lack of delivery reliability resulting from the use of UDP. However, as those of skill in the art will appreciate, UDP is not a requirement and other connection-oriented protocols, such as TCP or the so-called Hypertext Transfer Protocol (HTTP) may be equally employed. This is illustrated, for example, in FIG. 5 where TCP 550, 560 and/or HTTP blocks 555, 565 are used in place of the UDP blocks 508, 526. In these instances, the reliability related blocks 510-514, 528, 530 are not required. Instead, data accumulation processing 570-585 is provided to ensure that full messages are accumulated before being passed to higher layers.

Figure 6:
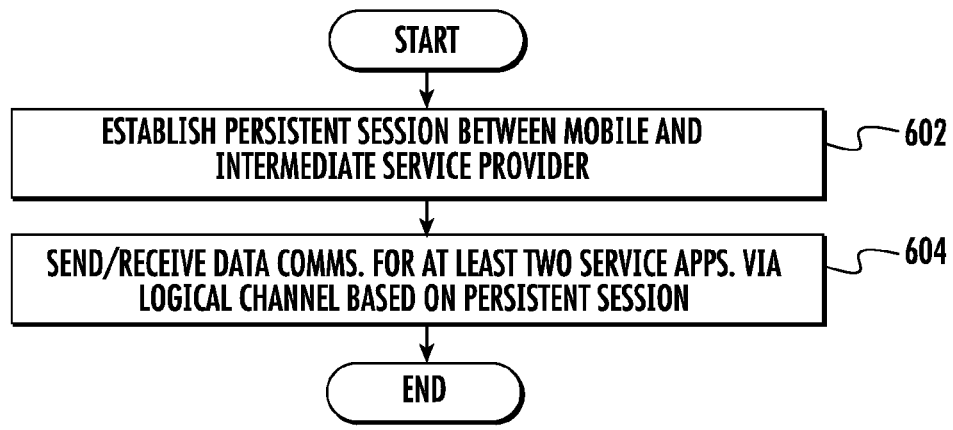
FIG. 6 is a flow chart illustrating processing performed in support of communications between a mobile terminal and an intermediate service provider in accordance with an embodiment of the present invention.

The processing described above is further illustrated with reference to FIG. 6 where a flow chart illustrating processing in accordance with an embodiment of the present invention is further described. Thus, beginning at block 602, a persistent session between the intermediate service provider and a mobile terminal is established. As described in further detail below, in a presently preferred embodiment, the persistent session is established based on a session request message sent by the mobile terminal. However, as known to those having skill in the art, such a session may be initiated by the intermediate service provider as necessary. Regardless, once a persistent session has been established between a mobile unit and the intermediate service provider, processing continues at block 604 where data communications for at least two service applications may be sent and/or received via the logical channel based on the persistent session established at block 602. In essence, the persistent session supports multiplexed data communications from at least two service applications in accordance with the protocol described herein. In this manner, the present invention provides greater efficiency of data transmission. An example of the technique for establishing a session between a mobile and intermediate service provider, as well as messages employed when multiplexing data communications along the logical channel and persistent session are further described with reference FIG. 7.

Figure 7:
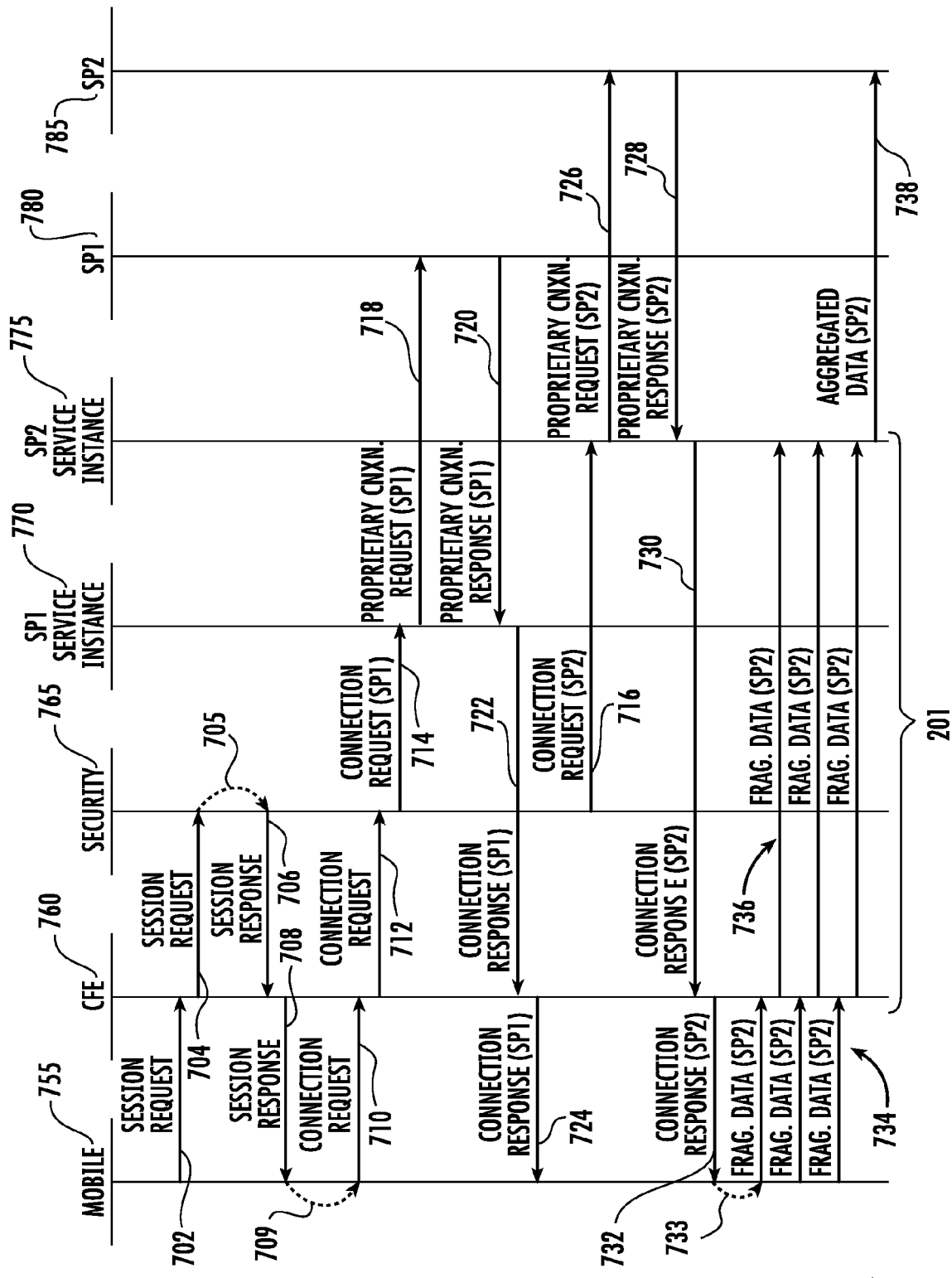
FIG. 7 is a sequence diagram illustrating communications between various components of a communication system in accordance with an embodiment of the present invention.

Referring now to FIG. 7, a sequence diagram in accordance with an embodiment of the present invention is further illustrated. In particular, communications between a mobile unit 755, the intermediate service provider 201 and first and second service providers 780, 785 (in this example) are illustrated. Within the intermediate service provider 201, communications from/to a client front end 760, a security server 765, a first service provider service instance 770 and a second service provider service instance 775 are also illustrated. In a presently preferred embodiment, when initiating a new session, the mobile unit 755 sends a session request message 702 to the intermediate service provider 201 that, as described above, is received by the client front end 760. In a presently preferred embodiment, the session request message includes a user name associated with the mobile terminal 755. In turn, the client front end 760 forwards the session request message 704 to a security server 765. The security server 765 may be implemented as part of an intermediate service provider 201 or as a stand-alone device as a matter of design choice. It is further noted that, in a presently preferred embodiment, communications with the security server 765 proceed in the manner described above relative to FIG. 5, i.e., through the appropriate transport layer(s). In response 705, the security server generates a session encryption key that it subsequently encrypts with a password previously associated with the user name. Thereafter, the security server 765 sends a session response message to the client front end 760 enclosing the session encryption key as well as a session identification that uniquely identifies the persistent session. In turn, the client front end 760 forwards the session response message 708 to the mobile terminal 755, including not only the session key but also the information necessary for the mobile terminal to communicate with the assigned client front end, e.g, the UDP/IP addresses of the client front end. Thereafter, the mobile terminal 755 can decrypt 709 the session key using the previously supplied password.

Having now established a session with the intermediate service provider 201 (more specifically, with a corresponding client front end 760), the mobile terminal 755 may send a connection request 710 to the client front end 760. In accordance with a presently preferred embodiment, the connection request message 710 includes a list of all selected services with which the mobile terminal desires to establish a connection. To this end, the mobile terminal receives indications of selections (provided by a user of the mobile terminal) of particular services to be included in the connection request message. Techniques for receiving such selection indications are well known to those having ordinary skill in the art.

Once the client front end 760 receives the connection request message 710, it forwards the connection request message 712 to the security server 765 where the selection indications are decrypted using the session key previously established. As described in further detail below, the connection request message 712 once decrypted, includes an identification of the particular service or services indicated by the mobile terminal 755. This is illustrated in FIG. 7 where the security server 765, in response to the single connection request message 712, provides a first connection request 714 to the first service provider service instance 770 as well as a second connection request 716 to the second service provider service instance 775. In response, both the first service provider service instance 770 and the second service provider service instance 775 send proprietary connection requests 718, 726 to the respective service providers 780, 785. As user herein, "proprietary" communications with service providers refers to the fact that each service provider may use a messaging protocol that is unique to that service provider. Thus, each corresponding service instance is provided to act as a virtual fixed point from the point of view of both the mobile terminal and the service provider by terminating the communication protocols with each while "translating" between the two.

In response to the proprietary connection requests 718, 726, both of the service providers 780, 785 respond with proprietary connection response messages 720, 728 to their respective service instances 770, 775 (assuming, of course, that the proprietary connection requests 718, 726 are acceptable). Note that the order of arrival of the proprietary connection response messages 720, 728 illustrated in FIG. 7 are for illustration purposes only. In turn, the service instances 770, 775 transform the proprietary connection response messages 720, 728 into one or more appropriate commands (as described below with reference to FIGS. 12 and 13) that are provided as connection response messages 722, 730 to the client front end 760. As the client front end 760 receives the connection response messages 722, 730, it in turn forwards the connection response messages 724, 732 to the mobile terminal 755 using the logical channel and based on the persistent session as described above. In this manner, the present invention provides a mechanism for a single connection request to establish communications with multiple service providers.

Figure 8:
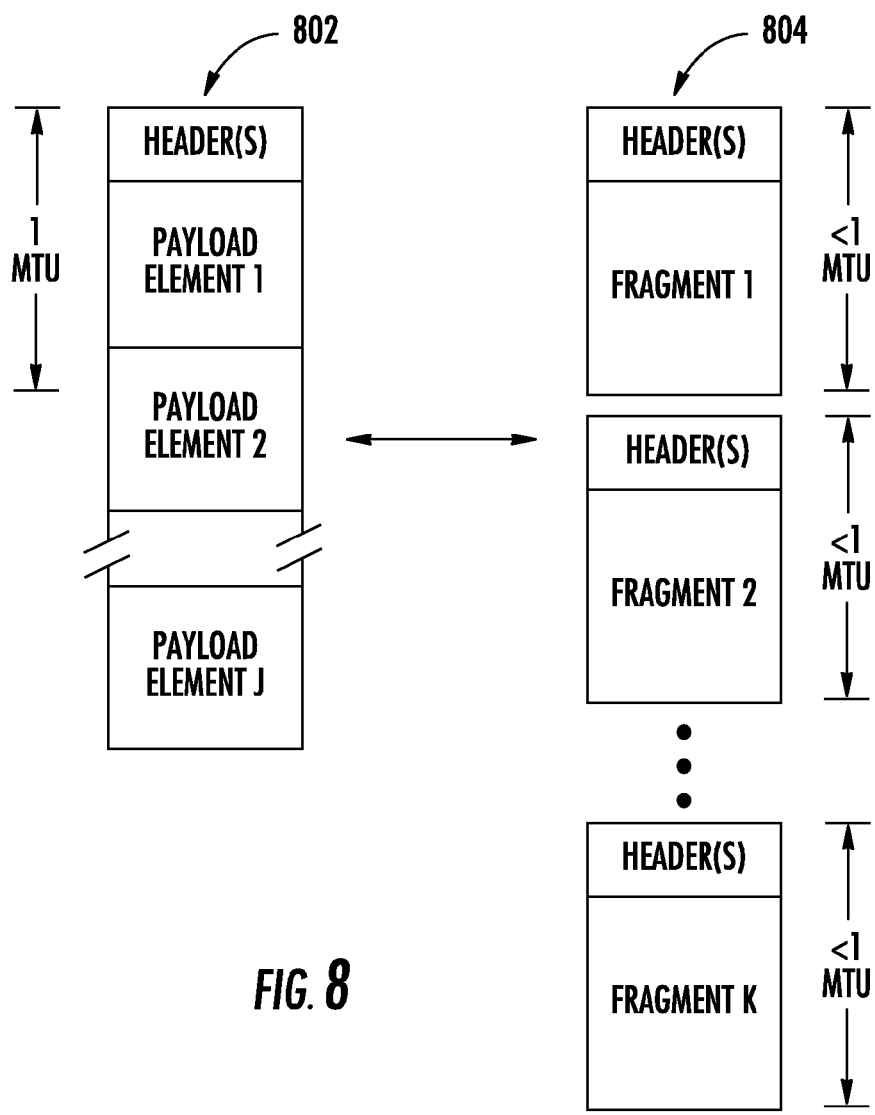
FIG. 8 is an illustration of fragmentation/de-fragmentation processing of data communications in accordance with an embodiment of the present invention.

As noted above, the present invention preferably utilizes UDP in order to communicate between the mobile terminal 755 and the client front end 760. However, as known in the art, data transfers using UDP messages typically may not exceed a maximum transmission unit (MTU) size, e.g., 1,500 bytes, based on limitations of the underlying datalink layer. Thus, messages that are larger than a single MTU must be broken up (i.e., fragmented, as described above) and subsequently reassembled (de-fragmented) in order to be successfully transferred. An example of the fragmentation process is illustrated in FIGS. 7 and 8. Referring now to FIG. 8, a message 802 comprising one or more headers and up to J payload elements is illustrated. As shown, the message 802 is larger than a single MTU and therefore must be broken up into a plurality of fragments 804 wherein each fragment includes a header and a portion of the message 802 (designated as fragments 1 through K) such that the resulting fragment messages are no greater than a single MTU. This is shown in FIG. 7 where, in response 733 to a connection response message 732 received in this example from the second service provider 732, multiple fragmentary messages 734 are originated by the mobile terminal 755 (via its corresponding transport layer 204 described above) and sent to the client front end 760. In turn, the client front end 760 forwards the fragmentary data messages 736 to the second service provider service instance 775 corresponding to the second service provider 785. In accordance with the transport layer 504 described above, the second service provider service instance 775 aggregates or de-fragments the multiple fragmentary messages 736 such that a full de-fragmented message 738 is provided to the second service provider 785.

It is noted that the opposite of the process illustrated by messages 734-738 may also occur. That is, a message sent by a service provider 780, 785 may be larger than a single MTU. In this case, the corresponding service provider service instance 770, 775 performs the fragmentation and sends the fragmentary messages to the client front end 760, which in turn forwards the various fragments to the mobile terminal. There, in accordance with processing by the mobile terminal's transport layer 204, the various fragments are reassembled as necessary.

As noted above, various embodiments of the present invention employ a standardized service message for transfer of messages between the mobile terminal and the intermediate service provider, as well as within the intermediate service provider. An exemplary service message is further illustrated with reference to FIG. 9. As shown, each service message 900 may comprise a version field, a service identification, a command identification, status and adjective fields, an options field, an options data length field, options data, command data length field data and command data. The version field identifies the particular version of the protocol adhered to by the service message 900. The service identification uniquely identifies the particular service application (and, by inference, the corresponding service provider) to which a given message applies. The command identification identifies command values that may be unique to each service or commands that are common or shared between one or more service applications, as described below. The status field is intended to convey a status condition of the system, whereas the adjective field conveys characteristics of the message, e.g., whether the message should be acknowledged, etc.

The options field identifies whether additional headers have been included in the service message, e.g., headers in support of fragmentation, encryption, compression, etc. In conjunction, if any of the options bits are set, indicating that additional headers are present in the message, the options data length field sets forth the length of such additional headers (e.g., in number of bytes) whereas the option data sets forth the additional header data. In a similar vein, the command data length field sets forth the length (again, preferably in number of bytes) of the command data.

The service message 900 described above is believed to be the message most often used. However, other message types may also be employed. For example, in a presently preferred embodiment, other message types include a "Keep Alive", or "Ack" or "Non-Ack Keep Alive" messages. Such message types may be used in place the service message 900 where appropriate. For example, the Keep Alive message preferably comprises a "dummy" message that is sent to prevent a logical channel/persistent session from being closed. Preferably, such Keep Alive messages are acknowledged by the recipient. The Ack message acknowledges receipt of a message and preferably includes the session identification and sequence number (as described below) of the message being acknowledged. Finally, the Non-Ack Keep Alive message is another "dummy" message that is sent to prevent the logical channel/persistent session from being closed without requiring, however, acknowledgment by the recipient. Those having skill in the art that other message types could also be defined as a matter of design choice.

Figure 10:
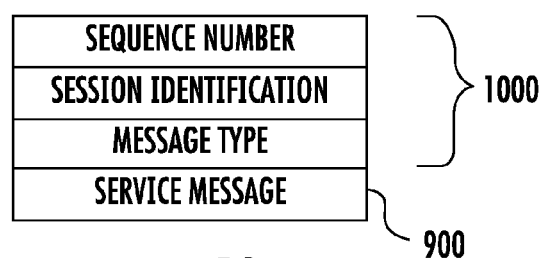
FIG. 10 is a block diagram of a message structure for particular use in transmitting messages between a mobile terminal and an intermediate service provider in accordance with an embodiment of the present invention.

Referring now to FIG. 10, a message structure particularly adapted for communications between a mobile terminal and intermediate service provider is illustrated. In particular, the message structure comprises a transport header 1000 as a prefix to a service message 900, as shown. Each transport header 1000 may comprise a sequence number, a sequence identification, a session identification, and a message type. The sequence number uniquely identifies a message. For example, for a new persistent session, the mobile terminal preferably initializes the sequence number to a random value. Any subsequent acknowledgement messages, if used, use the same value from the original message being acknowledged. For most all other messages, the sequence number is unique to each message relative to a particular direction (i.e., from versus to the mobile terminal) within a given persistent session. That is, the sequence number for messages sent to a server are independent of the those for messages sent by the server. Preferably, the sequence number is incremented for each message sent. Using the sequence number, the recipient (at the application level) is able to determine if a message was lost, was received out of order, or was resent. The session identification is preferably unique to each session/user/connection. As a special case, a session identification of zero indicates a new session is being requested. In this instance, the client front end allocates a new, unique session identification that is conveyed, as described above, back to the client in the session response message. Finally, the message type field describes what type of message is being sent, e.g., a service message or an encapsulated service message (as described below) or other message types.

Figure 11:
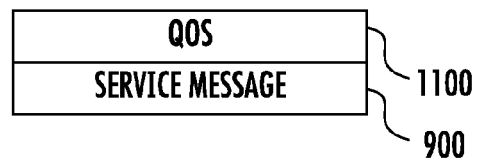
FIG. 11 is a block diagram of a message structure for particular use in transmitting messages between a client front end and service instance, both implemented within an intermediate service provider, in accordance with an embodiment of the present invention.

FIG. 11 illustrates an alternative message structure particularly adapted for communications between client front ends and service instances as described above. As shown, this so-called encapsulated message inserts a quality of service (QOS) header 1100 between the transport header 1000 and the service message 900. Generally, the QOS header 1100 instructs the client front end how to handle delivery-related events and retransmission rules, and alternatively includes information from the client front end requested for delivery by the service instance. For example, the QOS header 1100 may include bit flags or the like that indicate to the client front end the retransmit frequency to be applied to a given message as well as the period over which such retransmission, if necessary, should be tried. Similarly, flags may be included defining delivery conditions when the service instance is to be notified by the client front end, e.g., when the message is acknowledged/not acknowledged by the recipient, or when a previously lost connection (i.e., logical channel) is subsequently restored. When the QOS header 1100 is sent from a client front end to a service instance, it may include the requested notifications. Those having skill in the art will appreciate that other flags, notifications, etc. may be similarly defined as a matter of design choice.

Figure 12:
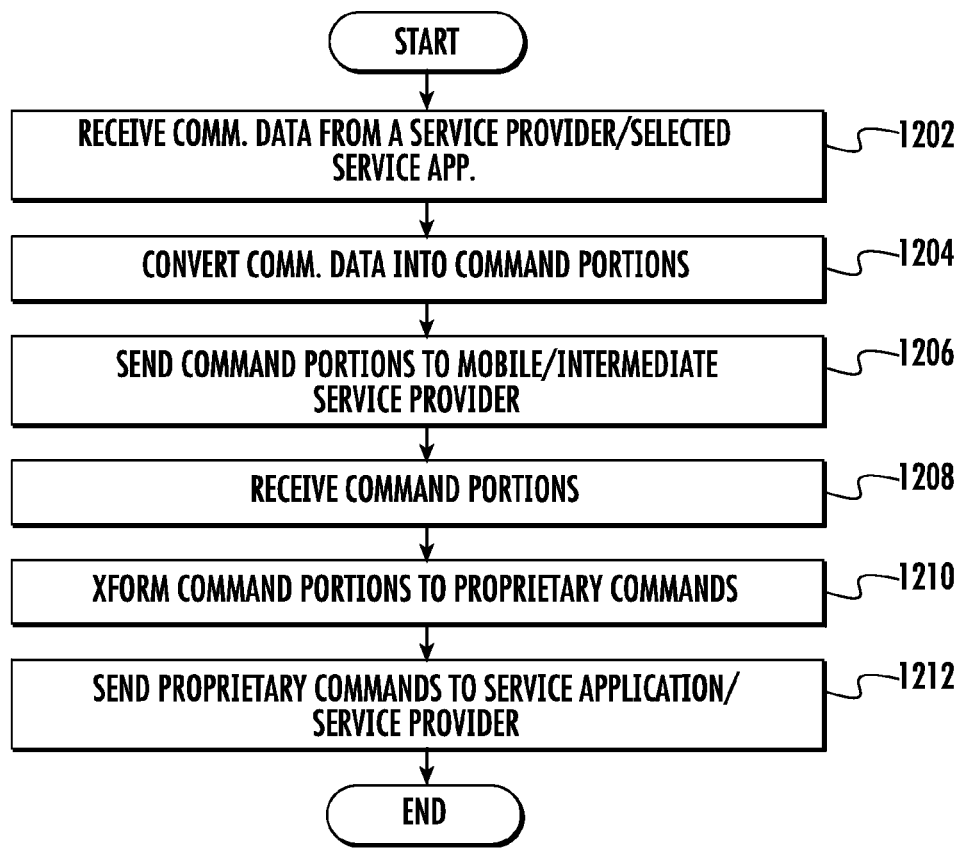
FIG. 12 is a flow chart illustrating processing of communication data using various common-functionality command portions in accordance with an embodiment of the present invention.

Referring now to FIG. 12, processing of communication data using various common-functionality command portions is further described. The processing illustrated in FIG. 12 is applicable to communication data sent be either a mobile terminal or a service provider. As such, the processing illustrated in FIG. 12 is performed by mobile terminals and an intermediate service provider, as described above. Beginning at block 1202, communication data from either a selected service application or a service provider is received, respectively, in a mobile terminal or an intermediate service provider. Thereafter, at block 1204, the communication data is converted into a plurality of command portions. In an embodiment of the present invention, a first command portion embodies functionality of the communication data that is common to a set of the service applications. In turn, a second command portion embodies functionality of the communication data specific to a subset of the set of service applications. For example, the first command portion may embody functionality that is common to all the services within the system. Conversely, the second command portion may embrace functionality that is common to a specific service class, which service class may embrace multiple specific service applications. In a presently preferred embodiment, a third command portion is provided which embodies functionality common to specific service applications. Through the use of such common functionality embodied by specific command portions, the present invention eliminates some of the redundancy typically associated with multiple applications when used in a wireless communication system.

Figure 13:
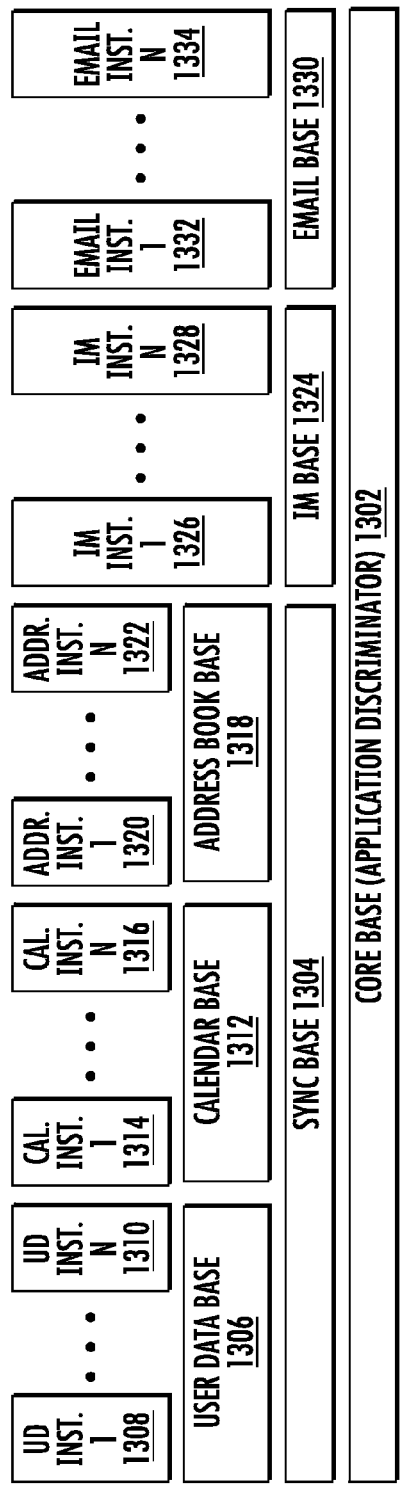
FIG. 13 is a schematic block diagram of a presently preferred breakdown of common-functionality command sets in accordance with the present invention.

An example of the a breakdown of common-functionality command or message sets in accordance with a presently preferred embodiment is further illustrated with reference to FIG. 13. When implemented, the message hierarchy illustrated in FIG. 13 is deployed within both the mobile terminals and the intermediate service provider, thereby allowing both ends of the multiplexed communication channel to minimize necessary overhead traffic communicated via the multiplexed channel. In the example illustrated, a core base of messages 1302 is provided the includes functionality that is global in its application, i.e., that is common to all service applications. Examples of such messages include connection request and response messages, error messages, disconnect request messages, content request and response messages, etc. Other such messages may be apparent to those of skill in the art.

Above the core base 1302, various service type-specific message sets are defined. In particular, synchronization base messages 1304, IM base messages 1324 and email base messages 1330 are shown. The synchronization base messages 1304 include messages embracing functionality common to all synchronization-related service applications, such as user data service applications, calendar service applications and/or address book service applications. Such messages may include, by way of non-limiting example, synchronization request and response messages, synchronization data, etc. Likewise, the IM base messages 1324 and email base messages 1330 include functionality common to those classes of service. Other classes of service suitable for definition in this manner may be apparent to those of skill in the art.

Further subsets of common functionality may be defined up to the point of specific implementations of a given service. For example, as shown, multiple IM service instances 1326-1328 are provided, each of which may include various messages that are specific to that implementation. Likewise, various email service instances 1332-1334 may be provided that use proprietary messages that cannot be generalized. On the other hand, further levels of common functionality may employed as illustrated, for example, by the user data base messages 1306, calendar base messages 1312 and address book base messages 1318 that serve as intermediate levels of common functionality specific to those service types. Once again, at the most specific level, one or more specific services instances for each service type may be provided, e.g., for user data services 1308-1310, calendar services 1314-1316 and address book services 1320-1322. By defining messages for such common functionality at various levels of abstraction, the present invention can beneficially reduce the amount of overhead required to implement multiple service applications.

Referring once again to FIG. 12, processing continues at block 1206 where the plurality of command portions are sent to a mobile terminal or intermediate service provider, as necessary, as described above. Thereafter, at block 1208, the plurality of command portions are received by the mobile terminal or intermediate service provider. Reversing the process of establishing the command portions as described above, the receiving device (mobile terminal, or intermediate service provider) transforms 1210 the plurality of command portions to proprietary commands particularly adapted to the specific service application or service provider for which they are intended. In this application, the core messaging level 1302, for example, in the messaging hierarchy illustrated in FIG. 13 acts essentially as a service application discriminator in that it allows the core messages to be interpreted to ascertain which application service (e.g., synchronization, IM, email, etc.) a given message is intended for. Thereafter, at block 1212, the resulting proprietary commands are provided to the targeted service applications/service provider.

While the particular preferred embodiments of the present invention have been shown and described, it will be obvious to those skilled in the art that changes and modifications may be made without departing from the teachings of the invention. It is therefore contemplated that the present invention cover any and all modifications, variations or equivalents that fall within the scope of the basic underlying principles disclosed above and claimed herein.

What is claimed is:

1. In a mobile communication system comprising mobile terminals using service applications provided by corresponding service providers, the mobile communication system further comprising an intermediate service provider in communication with the mobile terminals via respective corresponding transport layers over a persistent logical channel connection, and the service providers, a method for a mobile terminal of the mobile terminals to communicate with the service providers, the method comprising:
  sending, to an intermediate service provider, a session request message;
  receiving, from the intermediate service provider, a session response message comprising a session identification corresponding to a session established between the respective corresponding transport layers over the persistent logical channel connection of the mobile terminal and the intermediate service provider; and
  sending, to the intermediate service provider, multiplexed data communications for at least two different service applications of the service applications via a level of the mobile terminal transport layer over the persistent logical channel connection between the intermediate service provider and the mobile terminal based on the session identification, the multiplexed data communications to be received via the intermediate service provider transport layer.

2. The method of claim 1, wherein sending the multiplexed data communications for the at least two different service applications further comprises:
  sending, to the intermediate service provider via the persistent logical channel connection, a first message comprising the session identification and a first service identification corresponding to a first of the at least two different service applications.

3. The method of claim 2, wherein sending the multiplexed data communications for the at least two different service applications further comprises:
  sending, to the intermediate service provider via the persistent logical channel connection, a second message comprising the session identification and a second service identification corresponding to a second of the at least two different service applications.

4. The method of claim 1, further comprising:
  sending, to the intermediate service provider, a connection request message for the at least two different service applications via the persistent logical channel connection and based on the session identification.

5. The method of claim 4, further comprising:
  receiving, from the intermediate service provider, a connection response message, initiated by a service provider of the service providers corresponding to either of the at least two different service applications via the persistent logical channel connection and based on the session identification.

6. The method of claim 1, further comprising:
receiving, from the intermediate service provider, further multiplexed data communications for either of the at least two different service applications via the persistent logical channel connection and based on the session identification.

7. In a mobile communication system comprising mobile terminals using service applications provided by corresponding service providers, the mobile communication system further comprising an intermediate service provider in communication with the mobile terminals and the service providers, a method for an intermediate service provider to communicate with a mobile terminal of the mobile terminals, the method comprising:
receiving, from the mobile terminal, a session request message at an intermediate service provider transport layer over a persistent logical channel connection;
sending, to the mobile terminal, a session response message to be received by a mobile terminal transport layer over the persistent logical channel connection and comprising a session identification corresponding to a session established between the respective corresponding transport layers over the persistent logical channel connection of the mobile terminal and the intermediate service provider; and
receiving, from the mobile terminal, multiplexed data communications for at least two different service applications of the service applications via a level of the mobile terminal transport layer over the persistent logical channel connection between the intermediate service provider and the mobile terminal based on the session identification.

8. The method of claim 7, wherein receiving the multiplexed data communications for the at least two different service applications further comprises:
receiving, from the mobile terminal via the persistent logical channel connection, a first message comprising the session identification and a first service identification corresponding to a first of the at least two different service applications;
upon receiving the first message, validating the session identification; and
routing the first message, based on the first service identification, to a first application-specific service instance instantiated by the intermediate service provider.

9. The method of claim 8, wherein receiving the multiplexed data communications for the at least two different service applications further comprises:
receiving, from the mobile terminal via the persistent logical channel connection, a second message comprising the session identification and a second service identification corresponding to a second of the at least two different service applications;
upon receiving the second message, validating the session identification; and
routing the second message, based on the second service identification, to a second application-specific service instance instantiated by the intermediate service provider.

10. The method of claim 7, further comprising:
receiving, from the mobile terminal, a connection request message for the at least two different service applications via the persistent logical channel connection and based on the session identification; and sending, to each of those service providers of the service providers corresponding to the at least two different service application, a proprietary connection request in response to the connection request message.

11. The method of claim 10, further comprising:
receiving, from a service provider of the service providers corresponding to either of the at least two different service applications, a proprietary connection response in response to the proprietary connection request; and
sending, to the mobile terminal, a connection response message, in response to the proprietary connection response, via the persistent logical channel connection and based on the session identification.

12. The method of claim 7, further comprising:
receiving, from either service provider of the service providers corresponding to the at least two different service applications, data communications; and
sending, to the mobile terminal, further multiplexed data communications comprising the data communications from either service provider via the persistent logical channel connection and based on the session identification.

13. A mobile terminal for use in a mobile communication system and capable of using service applications provided by corresponding service providers, the mobile communication system further comprising an intermediate service provider in communication with the mobile terminal and the service providers, the mobile terminal comprising:
means for sending via a mobile terminal transport layer over a persistent logical channel connection, to a transport layer of an intermediate service provider, a session request message;
means for receiving at the mobile terminal transport layer over the persistent logical channel connection, from the transport layer of the intermediate service provider, a session response message comprising a session identification corresponding to a session established between the respective corresponding transport layers of the mobile terminal and the intermediate service provider; and
means for sending via the mobile terminal transport layer over the persistent logical channel connection, to the transport layer of the intermediate service provider, multiplexed data communications for at least two different service applications of the service applications via a level of the mobile terminal transport layer over the persistent logical channel connection between the intermediate service provider and the mobile terminal based on the session identification.

14. The mobile terminal of claim 13, wherein the means for sending the multiplexed data communications for the at least two different service applications is further operative to send, to the intermediate service provider via the persistent logical channel connection, a first message comprising the session identification and a first service identification corresponding to a first of the at least two different service applications.

15. The mobile terminal of claim 14, wherein the means for sending the multiplexed data communications for the at least two different service applications is further operative to send, to the intermediate service provider via the persistent logical channel connection, a second message comprising the session identification and a second service identification corresponding to a second of the at least two different service applications.

16. The mobile terminal of claim 13, further comprising:
means for sending, to the intermediate service provider, a connection request message for the at least two different service applications via the persistent logical channel connection and based on the session identification.

17. The mobile terminal of claim 16, further comprising:
means for receiving, from the intermediate service provider, a connection response message, initiated by a service provider of the service providers corresponding to either of the at least two different service applications via the persistent logical channel connection and based on the session identification.

18. The mobile terminal of claim 13, further comprising:
means for receiving, from the intermediate service provider, further multiplexed data communications for either of the at least two different service applications via the persistent logical channel connection and based on the session identification.

19. An intermediate service provider for use in a mobile communication system comprising mobile terminals using service applications provided by corresponding service providers, the intermediate service provider in communication with the mobile terminals and the service providers, and further comprising:
means for receiving via an intermediate service provider transport layer over a persistent logical channel connection, from a transport layer of the mobile terminal, a session request message;
means for sending via the intermediate service provider transport layer over the persistent logical channel connection, to the transport layer of the mobile terminal, a session response message comprising a session identification corresponding to a session established between the respective corresponding transport layers of the mobile terminal and the intermediate service provider; and
means for receiving via the intermediate service provider transport layer over the persistent logical channel connection, from the transport layer of the mobile terminal, multiplexed data communications for at least two different service applications of the service applications via a level of the mobile terminal transport layer over the persistent logical channel connection between the intermediate service provider and the mobile terminal based on the session identification.

20. The intermediate service provider of claim 19, wherein the means for receiving the multiplexed data communications for the at least two different service applications are further operative to receive, from the mobile terminal via the persistent logical channel connection, a first message comprising the session identification and a first service identification corresponding to a first of the at least two different service applications, and wherein the intermediate service provider further comprises:
means for validating the session identification upon receiving the first message; and
means for routing the first message, based on the first service identification, to a first application-specific service instance instantiated by the intermediate service provider.

21. The intermediate service provider of claim 20, wherein the means for receiving the multiplexed data communications for the at least two different service applications are further operative to receive, from the mobile terminal via the persistent logical channel connection, a second message comprising the session identification and a second service identification corresponding to a second of the at least two different service applications, wherein the means for validating are further operative to validate the session identification upon receiving the second message, and wherein the means for routing are further operative to route the second message, based on the second service identification, to a second application-specific service instance instantiated by the intermediate service provider.

22. The intermediate service provider of claim 19, further comprising:
means for receiving, from the mobile terminal, a connection request message for the at least two different service applications via the persistent logical channel connection and based on the session identification; and
means for sending, to each of those service providers of the service providers corresponding to the at least two different service application, a proprietary connection request in response to the connection request message.

23. The method of claim 22, further comprising:
means for receiving, from a service provider of the service providers corresponding to either of the at least two different service applications, a proprietary connection response in response to the proprietary connection request; and
means for sending, to the mobile terminal, a connection response message, in response to the proprietary connection response, via the persistent logical channel connection and based on the session identification.

24. The intermediate service provider of claim 19, further comprising:
means for receiving, from either service provider of the service providers corresponding to the at least two different service applications, data communications; and
means for sending, to the mobile terminal, further multiplexed data communications comprising the data communications from either service provider via the persistent logical channel connection and based on the session identification.

25. In a mobile communication system comprising mobile terminals using service applications provided by corresponding service providers, a method for communicating between a mobile terminal of the mobile terminals and the service providers, the method comprising:
establishing, between an intermediate service provider and the mobile terminal, a session between respective corresponding transport layers over a persistent logical channel connection, the intermediate service provider in communication with the mobile terminals via the respective corresponding transport layers over the persistent logical channel connection and the service providers; and
multiplexing data communications for at least two different service applications of the service applications onto a level of the mobile terminal transport layer over the persistent logical channel connection between the intermediate service provider and the mobile terminal, the multiplexed data communications to be received via the intermediate service provider transport layer over the persistent logical channel connection;
wherein the intermediate service provider mediates communications with those service providers of the service providers corresponding to the at least two different service applications based on the session regardless of availability of the persistent logical channel connection.

26. The method of claim 25, wherein multiplexing the data communications for the at least two different service applications further comprises:
sending, by the mobile terminal to the intermediate service provider, a first message comprising a session identification corresponding to the session and a first service identification corresponding to a first of the at least two different service applications; and upon receiving the first message, by the intermediate service provider, validating the session identification and routing the first message, based on the first service identification, to a first application-specific service instance instantiated by the intermediate service provider.

27. The method of claim 26, wherein multiplexing the data communications for the at least two different service applications further comprises:

sending, by the mobile terminal to the intermediate service provider, a second message comprising the session identification and a second service identification corresponding to a second of the at least two different service applications; and upon receiving the second message, by the intermediate service provider, validating the session identification and routing the second message, based on the second service identification, to a second application-specific service instance instantiated by the intermediate service provider.

28. The method of claim 25, wherein the service applications comprise any combination of: at least one email application, at least one instant messaging application, at least one calendar application and at least one address book application.

29. An intermediate service provider for use in a mobile communication system comprising mobile terminals using service applications provided by corresponding service providers, the intermediate service provider in communication with the mobile terminals and the service providers, and further comprising:

at least one intermediate service provider transport layer defining at least one client front end in communication with the mobile terminals and operative to establish a session with a transport layer of a mobile terminal of the mobile terminals over a persistent logical channel connection and to at least receive multiplexed data communications for at least two different service applications of the service applications from the mobile terminal via a level of the mobile terminal transport layer over the persistent logical channel connection between the at least one client front end and the mobile terminal; and at least one service instance in communication with the at least one client front end and at least one of the service providers, wherein the at least one service instance mediates communications with those service providers of the service providers corresponding to the at least two different service applications based on the session regardless of availability of the persistent logical channel connection.

30. The intermediate service provider of claim 29, further comprising:

at least one load balancer, in communication with the mobile terminals and the at least one client front end.

31. The intermediate service provider of claim 29, wherein the at least one service instance comprises at least one first service instance corresponding to a first service provider providing a first service application of the service applications and at least one second service instance corresponding to a second service provider providing a second service application of the service applications.

32. A mobile terminal for use in a mobile communication system and capable of using service applications provided by corresponding service providers, the mobile communication system further comprising an intermediate service provider in communication with the mobile terminal and the service providers, the mobile terminal comprising:

means for receiving, from an intermediate service provider transport layer via a mobile terminal transport layer over a persistent logical channel connection, selections indicative of at least two selected service applications of the service applications; and means for sending, to the intermediate service provider transport layer via the mobile terminal transport layer over the persistent logical channel connection, based on the selections, a connection request message specifying the at least two selected service applications to the intermediate service provider.

33. The mobile terminal of claim 32, further comprising:

means for receiving, from the intermediate service provider, a connection response message, initiated by a service provider of the service providers corresponding to either of the at least two different service applications.

34. An intermediate service provider for use in a mobile communication system comprising mobile terminals using service applications provided by corresponding service providers, the intermediate service provider in communication with the mobile terminals and the service providers, and further comprising:

means for receiving at an intermediate service provider transport layer over a persistent logical channel connection, from a transport layer of a mobile terminal of the mobile terminals, a connection request message specifying at least two selected service applications of the service applications; and means for sending, to each of those service providers of the service providers corresponding to the at least two different service application, a proprietary connection request in response to the connection request message.

35. The intermediate service provider of claim 34, further comprising:

means for receiving, from a service provider of the service providers corresponding to either of the at least two different service applications, a proprietary connection response in response to the proprietary connection request; and means for sending, to the mobile terminal, a connection response message, in response to the proprietary connection response.

* * * * *